US012567035B2

(12) United States Patent　　(10) Patent No.:　US 12,567,035 B2
Mishra et al.　　　　　　　　　　(45) Date of Patent:　　　Mar. 3, 2026

(54) CLASSIFICATION AS-A-SERVICE FOR ENTERPRISE RESOURCE PLANNING SYSTEMS

(71) Applicant: Dell Products L.P., Round Rock, TX (US)

(72) Inventors: Abhishek Mishra, Bangalore (IN); Vandita Krishna, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 219 days.

(21) Appl. No.: 18/479,186

(22) Filed: Oct. 2, 2023

(65) Prior Publication Data

US 2025/0111330 A1　　　Apr. 3, 2025

(51) Int. Cl.
*G06Q 10/087*　　　　(2023.01)
(52) U.S. Cl.
CPC ................................. *G06Q 10/087* (2013.01)
(58) Field of Classification Search
CPC .................................................. G06Q 10/087
See application file for complete search history.

(56) References Cited

U.S. PATENT DOCUMENTS

| | | | | |
|---|---|---|---|---|
| 7,107,254 B1 * | 9/2006 | Dumais | .................... | G06N 7/01 |
| | | | | 706/14 |
| 7,809,665 B2 * | 10/2010 | Acharya | .................. | G06N 7/01 |
| | | | | 706/47 |
| 2010/0145831 A1 * | 6/2010 | Esfandiari | ............ | G06Q 10/087 |
| | | | | 705/28 |
| 2017/0193389 A1 * | 7/2017 | Thomas | ................. | G06N 20/00 |
| 2018/0114128 A1 * | 4/2018 | Libert | .................... | G06Q 10/00 |

* cited by examiner

*Primary Examiner* — Garcia Ade

(74) *Attorney, Agent, or Firm* — Amin, Turocy & Watson, LLP

(57)　　　　　　　ABSTRACT

The technology described herein is directed towards product classification across multiple contexts within an enterprise environment, e.g., based on stock keeping unit (SKU-) related data. Relevant SKU attributes and patterns for each context are used to train machine learning-based classification models, which are then used to classify descriptive data of a product, such as one or more modules of a SKU. In one implementation, natural language processing and vectorization of input data are described to provide appropriate input to the trained classifier. Context-specific rules derived from domain knowledge and regulatory guidelines can be integrated to refine the classifications made by the model. The system incorporates integration with enterprise resource planning (ERP) systems, enabling efficient data management and classification within an existing infrastructure.

20 Claims, 15 Drawing Sheets

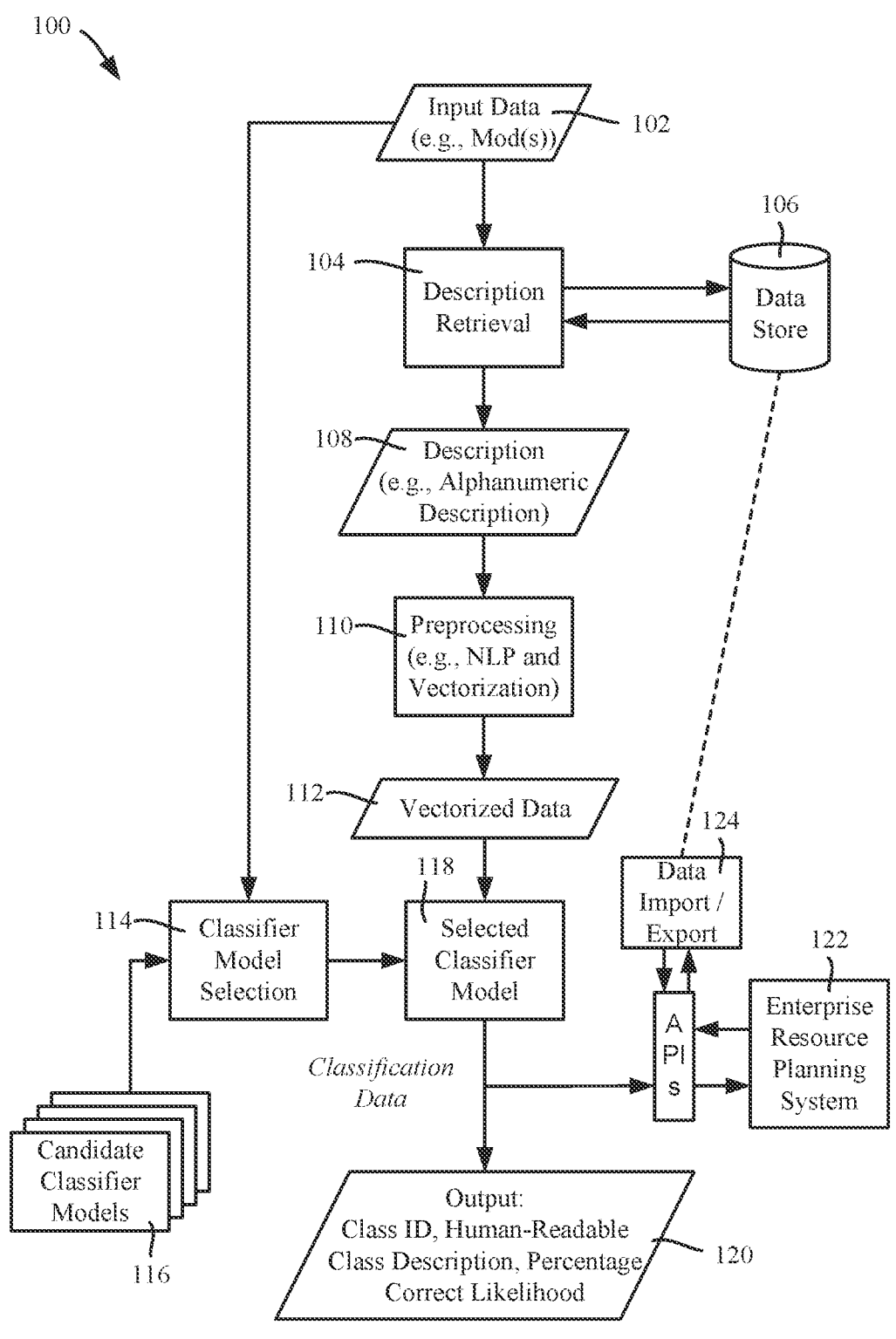

100

Input Data
(e.g., Mod(s))        102

104        Description
Retrieval

106        Data Store

108        Description
(e.g., Alphanumeric
Description)

110        Preprocessing
(e.g., NLP and
Vectorization)

112        Vectorized Data

114        Classifier
Model
Selection

118        Selected
Classifier
Model

124        Data
Import /
Export

122        Enterprise
Resource
Planning
System

APIs

Candidate
Classifier
Models        116

Classification
Data

Output:
Class ID, Human-Readable
Class Description, Percentage
Correct Likelihood        120

Define
Contexts to

442

Contexts

Master Data Management
Supply Chain
Pricing
Regulatory and Compliance
Sales and Marketing
Customer Segmentation
Inventory Management
Financial and Accounting

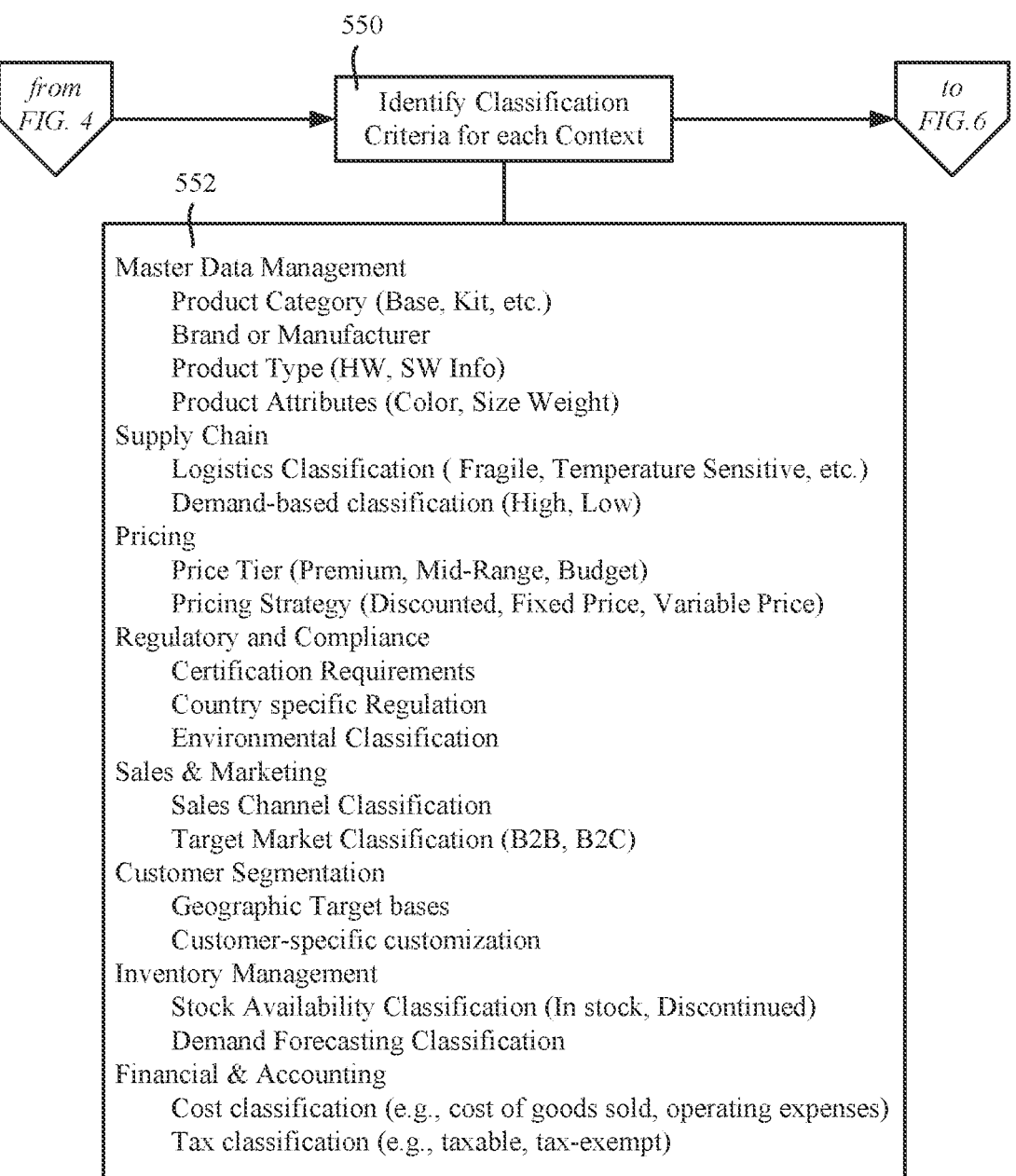

Master Data Management
    Product Category (Base, Kit, etc.)
    Brand or Manufacturer
    Product Type (HW, SW Info)
    Product Attributes (Color, Size Weight)
Supply Chain
    Logistics Classification ( Fragile, Temperature Sensitive, etc.)
    Demand-based classification (High, Low)
Pricing
    Price Tier (Premium, Mid-Range, Budget)
    Pricing Strategy (Discounted, Fixed Price, Variable Price)
Regulatory and Compliance
    Certification Requirements
    Country specific Regulation
    Environmental Classification
Sales & Marketing
    Sales Channel Classification
    Target Market Classification (B2B, B2C)
Customer Segmentation
    Geographic Target bases
    Customer-specific customization
Inventory Management
    Stock Availability Classification (In stock, Discontinued)
    Demand Forecasting Classification
Financial & Accounting
    Cost classification (e.g., cost of goods sold, operating expenses)
    Tax classification (e.g., taxable, tax-exempt)

FIG. 5

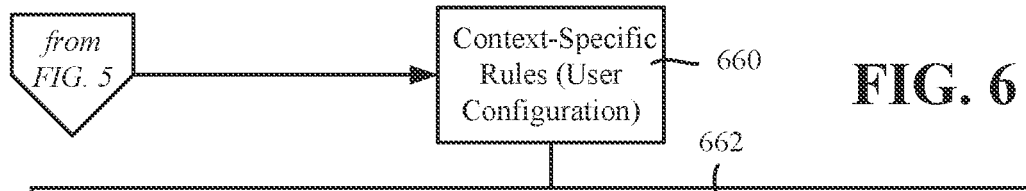

FIG. 6

1. Regulatory Compliance Context:
   Rule:
   If a SKU contains hazardous materials, classify it as "Regulated" regardless of other model predictions
   Example:
   A cleaning product that contains chemicals regulated by environmental agencies might be classified as "Regulated" due to its hazardous nature 2. Pricing Context:
   Rule:
   If the SKU's price is above a certain threshold, classify it as "Premium" irrespective of other model predictions
   Example:
   Luxury watches with a price above a specific threshold might be classified as "Premium" based on their high price point 3. Supply Chain Context:
   Rule:
   If the SKU requires cold storage, classify it as "Perishable" even if the model suggests a different classification
   Example:
   Fresh produce or dairy products that require refrigeration throughout the supply chain might be classified as "Perishable" due to their temperature sensitivity 4. Master Data Management Context:
   Rule:
   If a SKU belongs to the "Electronics" category, classify it as "High-Tech" regardless of other model predictions
   Example:
   Laptops, smartphones, and other electronic devices falling under the "Electronics" category might be classified as High-Tech" due to their nature 5. Sales and Marketing Context:
   Rule:
   If a SKU is part of a specific marketing campaign, classify it according to the campaign's designated classification, overriding the model prediction
   Example:
   If a SKU is associated with a seasonal holiday campaign, it might be classified based on the campaign's theme, such as "Holiday Edition" or "Limited Edition"

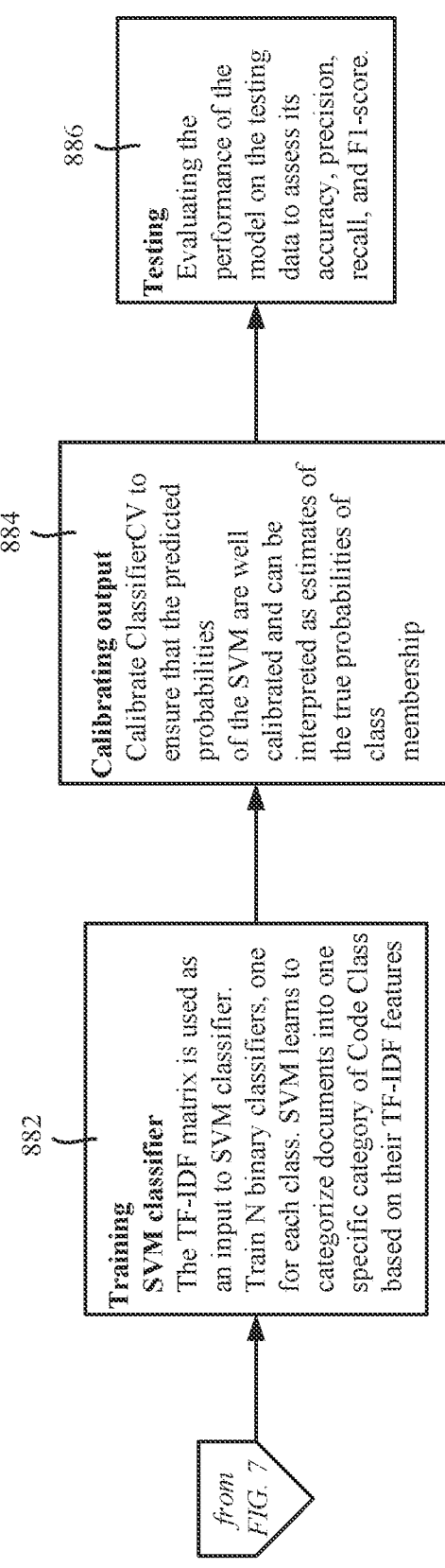

882

Training
SVM classifier
The TF-IDF matrix is used as an input to SVM classifier. Train N binary classifiers, one for each class. SVM learns to categorize documents into one specific category of Code Class based on their TF-IDF features

884

Calibrating output
Calibrate ClassifierCV to ensure that the predicted probabilities of the SVM are well calibrated and can be interpreted as estimates of the true probabilities of class membership

886

Testing
Evaluating the performance of the model on the testing data to assess its accuracy, precision, recall, and F1-score.

*from FIG. 7*

FIG. 8

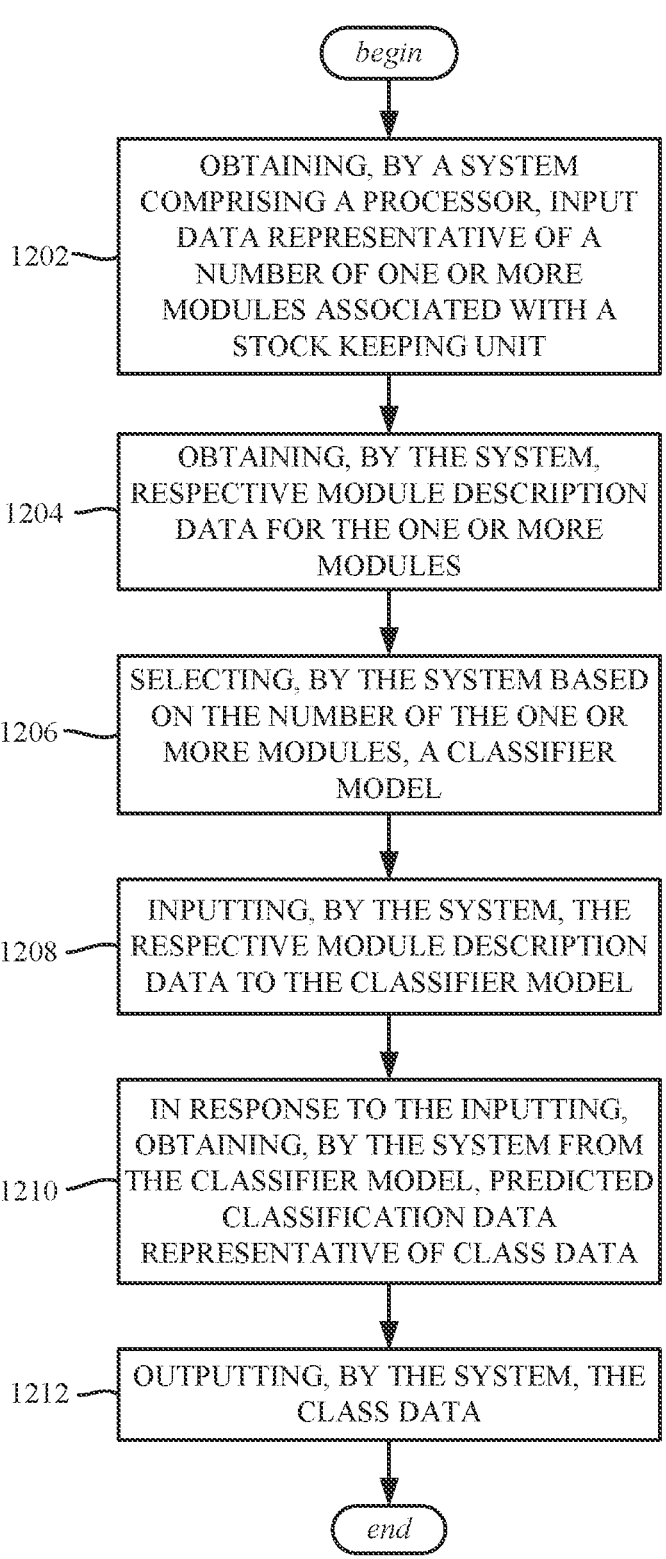

begin

1202 — OBTAINING, BY A SYSTEM COMPRISING A PROCESSOR, INPUT DATA REPRESENTATIVE OF A NUMBER OF ONE OR MORE MODULES ASSOCIATED WITH A STOCK KEEPING UNIT

1204 — OBTAINING, BY THE SYSTEM, RESPECTIVE MODULE DESCRIPTION DATA FOR THE ONE OR MORE MODULES

1206 — SELECTING, BY THE SYSTEM BASED ON THE NUMBER OF THE ONE OR MORE MODULES, A CLASSIFIER MODEL

1208 — INPUTTING, BY THE SYSTEM, THE RESPECTIVE MODULE DESCRIPTION DATA TO THE CLASSIFIER MODEL

1210 — IN RESPONSE TO THE INPUTTING, OBTAINING, BY THE SYSTEM FROM THE CLASSIFIER MODEL, PREDICTED CLASSIFICATION DATA REPRESENTATIVE OF CLASS DATA

1212 — OUTPUTTING, BY THE SYSTEM, THE CLASS DATA end

FIG. 12

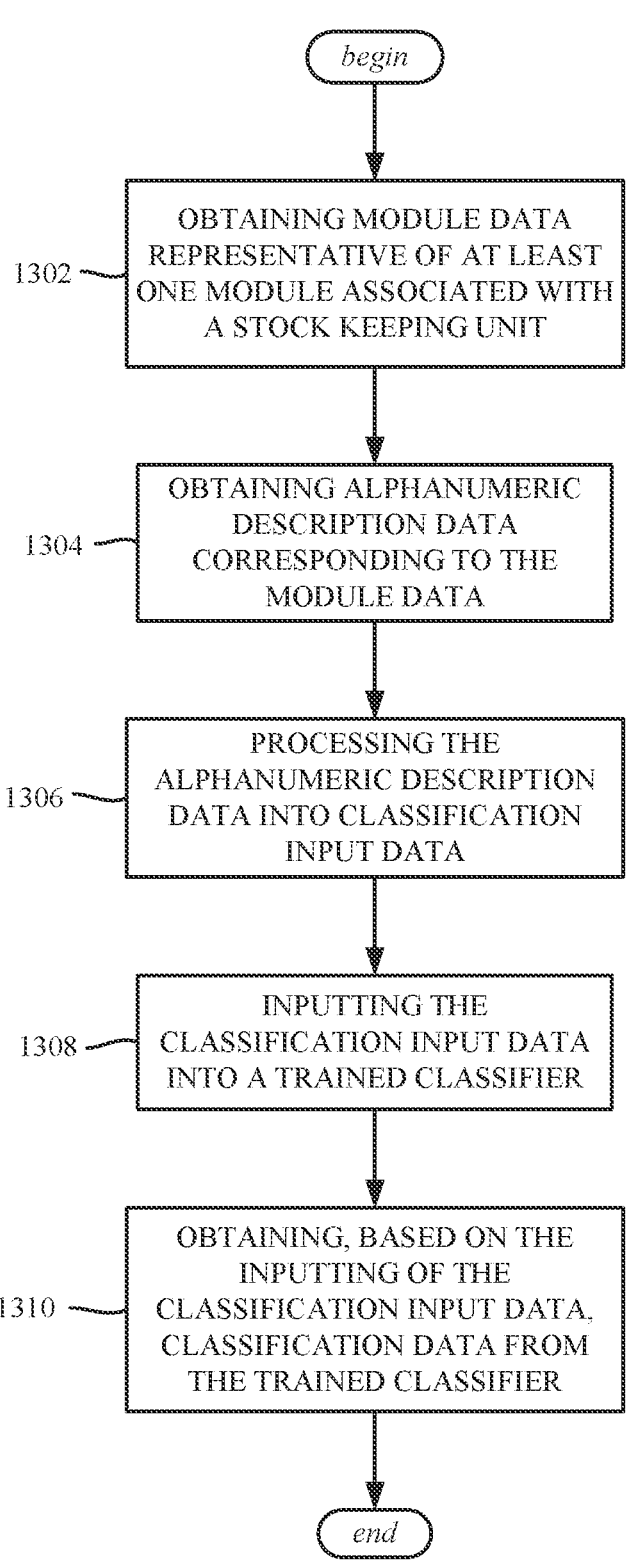

begin

1302 — OBTAINING MODULE DATA REPRESENTATIVE OF AT LEAST ONE MODULE ASSOCIATED WITH A STOCK KEEPING UNIT

1304 — OBTAINING ALPHANUMERIC DESCRIPTION DATA CORRESPONDING TO THE MODULE DATA

1306 — PROCESSING THE ALPHANUMERIC DESCRIPTION DATA INTO CLASSIFICATION INPUT DATA

1308 — INPUTTING THE CLASSIFICATION INPUT DATA INTO A TRAINED CLASSIFIER

1310 — OBTAINING, BASED ON THE INPUTTING OF THE CLASSIFICATION INPUT DATA, CLASSIFICATION DATA FROM THE TRAINED CLASSIFIER end

FIG. 13

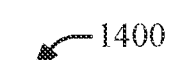
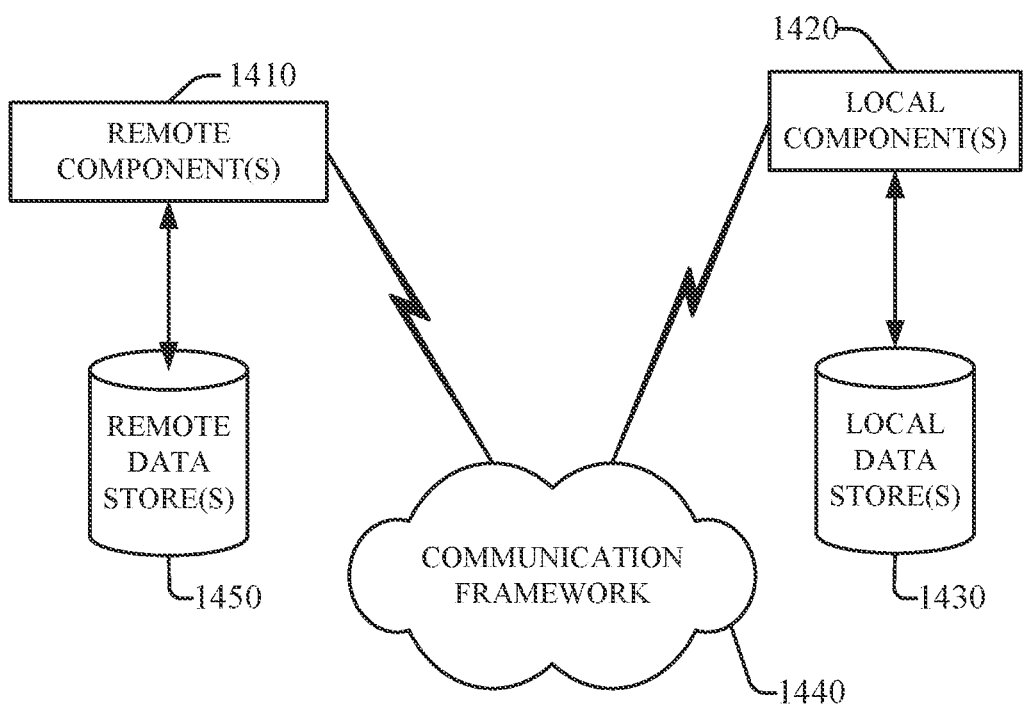
FIG. 14

CLASSIFICATION AS-A-SERVICE FOR ENTERPRISE RESOURCE PLANNING SYSTEMS

BACKGROUND

Within enterprise environments, a stock keeping unit (SKU) is a coded identifier used in manufacturing and retail business-related processes; as one typical example, SKUs are used to track inventory. SKU classification within an enterprise environment can be used across multiple contexts such as data management, supply chain optimization, pricing strategies, and regulatory compliance.

Existing approaches to SKU classification often overlook the diverse perspectives under which SKUs are viewed, resulting in inconsistent categorization and challenges in data management. Further, manual classification processes are time-consuming and error prone, and thus hinder scalability. The accuracy and usability of SKU classifications are significant, yet often hindered by existing classification techniques.

BRIEF DESCRIPTION OF THE DRAWINGS

The technology described herein is illustrated by way of example and not limited in the accompanying figures in which like reference numerals indicate similar elements and in which:

FIG. 1 depicts a block diagram representation of an example system/architecture for classification as-a-service, in accordance with various aspects and implementations of the subject disclosure.

FIGS. 4-6 comprise an example representation of details of typical contexts and parameters, in accordance with various aspects and implementations of the subject disclosure.

FIGS. 7 and 8 comprise example operations related to classifier model development including training and testing, in accordance with various aspects and implementations of the subject disclosure.

FIG. 12 is a flow diagram showing example operations related to outputting class data via a selected classifier model based on stock keeping unit module data, in accordance with various aspects and implementations of the subject disclosure.

FIG. 13 is a flow diagram showing example operations related to obtaining classification data from a trained classifier based on module data, in accordance with various aspects and implementations of the subject disclosure.

FIG. 14 is a block diagram representing an example computing environment into which aspects of the subject matter described herein may be incorporated.

DETAILED DESCRIPTION

Figure 2:
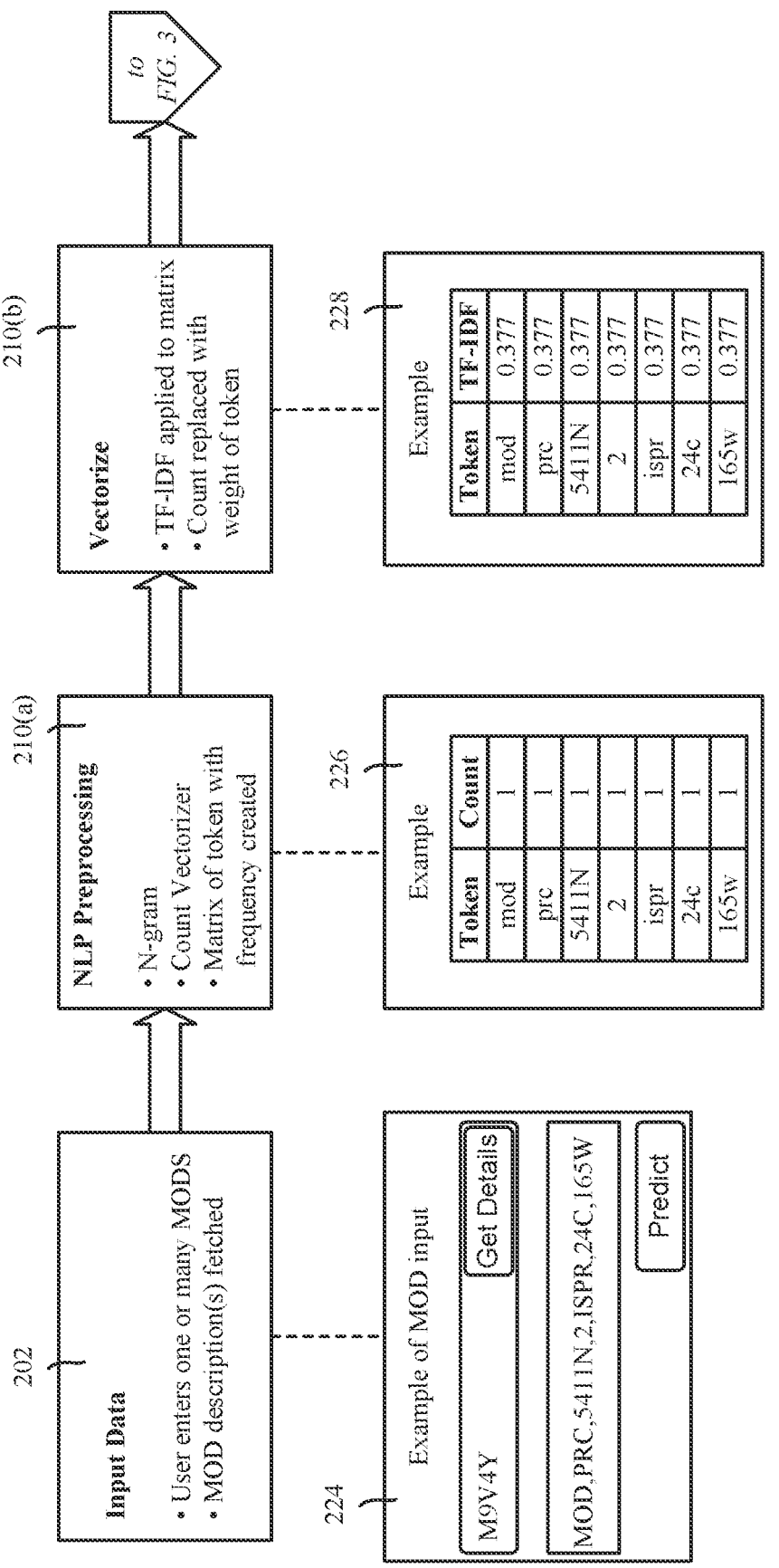
FIGS. 2 and 3 comprise an example block diagram representation of components and data flow in which a trained classifier model recommend a class code with a probability value based on input data, in accordance with various aspects and implementations of the subject disclosure.

Various aspects of the technology described herein are generally directed towards product classification via a trained (machine learning) classification model across multiple contexts within an enterprise environment, such as master data management, supply chain, pricing, regulatory compliance, and others, e.g., based on stock keeping unit (SKU-) related data. Note that as used herein, "product" refers to any enterprise offering that needs to be classified, including conventional physical products as well as services or the like, or some combination of physical products and services. The ability to accurately classify SKUs and/or SKU-related data in such diverse contexts via a single system provides a significant improvement over existing techniques. As will be understood, the technology described herein also can incorporate context-specific rules derived from domain knowledge and regulatory guidelines; such rules refine the SKU classifications made by the classification model, ensuring compliance with industry-specific requirements while improving the accuracy of categorization.

In general, the classification is based on extracting meaningful features from SKU-related data. The technology described herein can use bill of material details of the SKUs for accurate classification.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimization," "optimize" or "optimal" and the like (e.g., "maximize," "minimize" and so on) only represent objectives to move towards a more optimal state, rather than necessarily obtaining ideal results. Thus, an "optimal action" for example can be the best estimated action from a set of available candidate actions, even though a more optimal action may exist that is not in the candidate action set.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example architecture/system 100 of one implementation of the technology described herein. In FIG. 1, input data 102, such as description data of a product, are entered into the system 100. In one example implementation, the description data includes module identification data in the form of one or more user modules (corresponding to a part or parts of a stock keeping unit, or SKU; that is, modules, or "MODs," identify the parts under a SKU). An example of module identification data is a string such as "T79R8" which in one enterprise refers to a cable. As will be understood, via the technology described herein, the alphanumeric descriptions of modules under a SKU that form the bill of materials ("BOM", typically a list of materials and associated quantities) of a SKU are used to predict a SKU's classification data, based on existing data in the system.

To this end, the module identification data is used by a description retrieval component 104 to obtain an alphanumeric description data 108 that matches the module identification data, e.g., via a query to a data store 106. For example, with "6PMJ3" as the query (module identifier data) in one enterprise system corresponding to the example implementation described herein, the description retrieval component 104 obtains the following alphanumeric description data for this module identifier data: "MOD,XCVR,PS, QSFP,100GIGE,SR,85". Note that the module identification data can include multiple modules, with the alphanumeric description data including multiple alphanumeric description results, e.g., one for each module entered as input data.

Block 110 represents preprocessing the alphanumeric description data, e.g., based on natural language processing (NLP) and vectorization. The result is classification input data, that is, appropriate for the classifier, which in this example is vectorized data 112. Additional details of the preprocessing are described with reference to FIGS. 2 and 3.

Block 114 represents classifier model selection from among a group of available candidate classifier models 116. For example, in one implementation, there are four available candidate classifier models, corresponding to differently trained models based on the number of MODs under the SKU, e.g., the number of MODs in the alphanumeric description data. The following sets forth these four models in the example implementation:

Single MOD model—SKUs with exactly 1 MOD under,
Two MOD model—SKUs with exactly 2 MODs under,
Three MOD model—SKUs with exactly 3 MODs under,
Multiple MOD Model—SKUs with more than 3 MODs under.

As can be readily appreciated, a single classifier model may be trained and used in other scenarios, or other schemes for selecting among classifier models of a group may be used in other implementations. Further, in other implementations, multiple classifier models can be used with their output data combined in a suitable way such as averaging, weighted averaging, and so on. Indeed, the technology described herein can leverage machine learning algorithms such as decision trees, random forests, logistic regression, and/or neural networks, to automate the classification process and make predictions based on the learned patterns.

In the example implementation of FIG. 1, the vectorized data 112 is input into the selected classifier model 118, resulting in classification data. The example output 120 is based on the classification data, and in this example includes a class identifier (ID), a human-readable class description (e.g., "processor") and a percentage value representing the likelihood of the predicted class identifier (and corresponding output data) being correct. Note that it is possible to have more than one output result in the classification data, such as described with reference to FIG. 10.

Further shown in FIG. 1 is integration of the classification system and architecture 100 described herein with an enterprise resource planning (ERP) system 122 by leveraging the classification system's capabilities as-a-service. For example, the classification system can expose well-defined and secure APIs that allow seamless communication between the as-a-service classification system solution and various ERP systems. These APIs are designed to support data exchange, transactional processes, and real-time synchronization of information. As described herein, the as-a-service classification system can seamlessly integrate with any ERP, thereby facilitating data exchange, real-time synchronization, and process automation between diverse enterprise systems.

For example, and in general, data mapping and transformation is provided, because different ERP systems have different customized data structures and formats. To this end, the as-a-service classification system maps and transforms the data exchanged between the systems. This involves determining the data requirements of each ERP system 122 to provide mapping rules and transformations that ensure compatibility and integrity. The as-a-service classification system can be designed with customized APIs to import data from and export data (block 124) to each of these ERPs.

The as-a-service classification system also can leverage event-driven integration capabilities. By monitoring and capturing relevant events within an ERP system 122, such as data updates or new transactions, the as-a-service classification system can proactively respond and trigger corresponding actions in real-time. Such event-based operation enables real-time data updates and maintaining data consistency across an enterprise; the integration of SKU classification within an ERP system streamlines data management and ensures the availability of accurate SKU classifications throughout the enterprise.

Configurability and extensibility facilitate ERP adaptability, such as by providing configuration options to tailor the integration to specific business requirements. To this end, the as-a-service classification system can offer flexible configuration settings, allowing organizations to customize mappings, workflows, and integration behavior without requiring extensive coding or development efforts.

Figure 3:
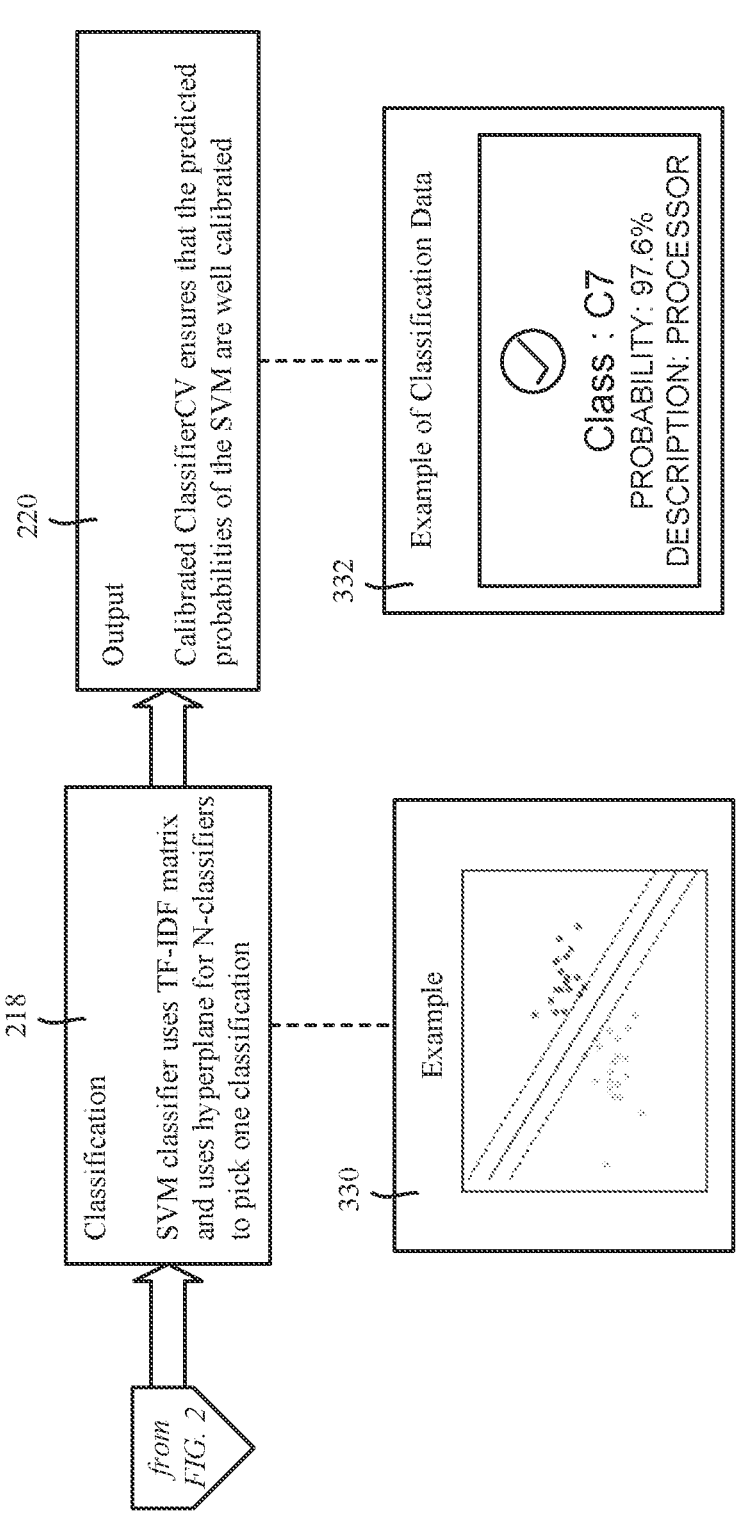

FIGS. 2 and 3 show additional details of the components, data flow, and operations of FIG. 1, along with examples. In FIGS. 2 and 3, the components/data are generally labeled 2xx to correspond to the labels 1xx of FIG. 1. In FIG. 2, the input data 202 (e.g., input via a user or process) thus includes one or more modules, from which the alphanumeric module description data is retrieved via a query to the data store. In the example 224 of FIG. 2, the MOD input is "M9V4Y" such that when the user clicks (or a process instructs) "Get Details" the alphanumeric module description data is returned as the string "MOD,PRC,5411N,2,ISPR,24C,165 W" in this example enterprise. The user (or process) can select "Predict" which activates the classification process.

The classification process continues at block 210 (a) which represents the natural language processing/NLP preprocessing. In general, NLP techniques encompass text preprocessing, feature extraction, and text classification, and are well-established in various other domains; by leveraging NLP techniques, the technology described herein effectively processes textual SKU attributes and extracts pertinent features for classification.

In this example, the NLP techniques of n-gram and count vectorizer capture the frequency of words and sequence of words data, as shown in the example 226, where the string "MOD,PRC,5411N,2,ISPR,24C,165 W" is tokenized into counts. Vectorization 210(*b*) based on the results matrix 226 in the example processes the results into term frequency-inverse document frequency (TF-IDF) values, that is, the TF-IDF vectorizer 210(*b*) assigns weights based on the most frequent words. A TF-IDF vectorizer is a known NLP technique that converts text documents into numerical vectors; by applying a TF-IDF vectorizer to SKU data, the technology described herein transforms textual information into numerical representations, enabling the utilization of machine learning algorithms for classification. In general, TF-IDF is a measure in information retrieval (IR) and machine learning that can quantify the importance or relevance of string representations (words, phrases) in a document among a collection of data, e.g., documents. TF-IDF is broken down into tokens by looking at the frequency of every word in this string within the context of the full training dataset; (example training is described with reference to FIGS. 7 and 8). Vectorization thus weighs each word of the string based on the word's relative frequency within the full training dataset.

The classification process continues at block 218 of FIG. 3, where the classifier (e.g., support vector machine, or SVM) takes the vector data from TF-IDF vectorizer 210(*b*) as input. Support vector machines are a set of supervised learning methods used for classification, regression, and outliers' detection. As is known with SVM, an SVM uses the hyperplane (decision boundary that differentiates classes in SVM) for N-classifiers to pick one classification, e.g., as shown in the example 330 of FIG. 3, that is, based on which side of the linear equation are the data. Note that a calibrated classifier is used to classify and predict the classification data, with an improved calibration of the predicted probability, that is, of the likelihood that the predicted class is correct.

The output 220 is thus the classification data (example 332) from the classifier 218. In this example 332, the classification data includes a class code ("C7"), where class code is a logical indexation and core attribute of SKUs. For example, there can be a class code for hard drives, monitors, adapters and so on. Further, by using a calibrated classifierCV (cross-validation), the probability of the class code being correct ("97.6%" in this example) is also reported; (a calibrated classifier SVM is an advanced variant of support vector machines that offers probabilistic outputs that facilitate accurate calibration and confidence estimation of classification predictions). This capability ensures reliable and precise SKU classification by quantifying the certainty associated with each classification decision. A human-readable description is also provided for this class code, e.g., a "processor" in this example, which can be determined via a database/lookup table query using the class code.

To summarize, in one example implementation the technology described herein integrates natural language processing techniques with TF-IDF vectorizer and calibrated classifier support vector machines (SVM) for SKU classification. The technology described herein presents an effective approach to SKU classification via this combination, which leverages the strengths of each component to enable accurate classification of SKUs based on their textual attributes, delivering a distinctive solution that enhances data management, supply chain optimization, pricing strategies, and regulatory compliance.

To ensure the context-specific accuracy of the classifications, the system integrates domain-specific and regulatory guidelines into the classification process. Context-specific rules, derived from industry knowledge and compliance requirements, refine the predictions made by the machine learning model. These rules help align the classifications with specific business needs, ensuring compliance with regulatory standards and improving the accuracy of SKU categorization. An example of creating such rules is shown in FIGS. 4-6.

Figures 4, 5:
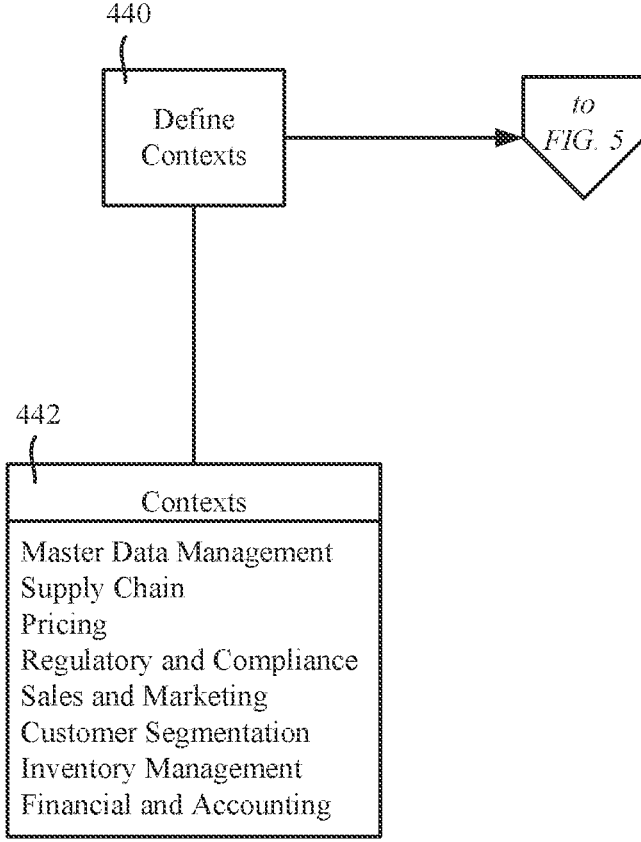

More particularly, in this example, block 440 of FIG. 4 represents defining the contexts, in which a user, team or other entity (e.g., an information-gathering process) determine the specific contexts in SKUs to be classified. Block 442 shows some nonlimiting examples, such as master data management, supply chain, pricing, regulatory compliance, sales and marketing, customer segmentation, inventory management, financial and accounting. Not all of these contexts need be present, and any other relevant areas can be added, e.g., depending on the corresponding type of enterprise.

The example continues at FIG. 5, in which block 550 represents identifying the classification criteria for each context, that is, to establish the criteria or attributes that are to be used to classify the SKUs. These criteria generally should be relevant to the specific context and can include factors such product attributes, regulatory requirements, pricing information, and so on. Nonlimiting example criteria and/or attributes are shown in block 552 of FIG. 5.

The example continues in FIG. 6, in which block 660 represents configuring context-specific rules for post-processing. Although a single model can provide overall classification, applying context-specific rules and/or post-processing operations can be used to fine-tune the results. For example, a system can incorporate rules that override or adjust the model's predictions based on specific requirements or regulations for each context. Nonlimiting examples of such rules along with accompanying explanatory examples are shown in block 662.

Turning to developing a classification model/set of rules that can analyze SKU-related data and assign appropriate classifications based on the identified criteria, it can be appreciated that such a classification model/set of rules needs to take into account the specific requirements of each context (e.g., FIGS. 4 and 5), as well as any context-specific rules and/or post-processing operations (e.g., FIG. 6) and update an enterprise's master data information accordingly. Any suitable programming languages, frameworks, and/or tools can be used, such that the system integrates with the enterprise's existing master data management system and other relevant systems, e.g., to ensure seamless updating of master data information based on the SKU classifications. Testing and refinement are performed, including to thoroughly test the system to ensure its accuracy and effectiveness in classifying SKUs in different contexts, and refining the classification model, rules and system based on feedback and real-world usage to improve the system's performance. Integration with ERP also is desirable in many enterprises, that is, using services for integration, the SKU classification system can be integrated with ERP systems to enable real-time data updates and maintain data consistency across an enterprise.

Figure 7:
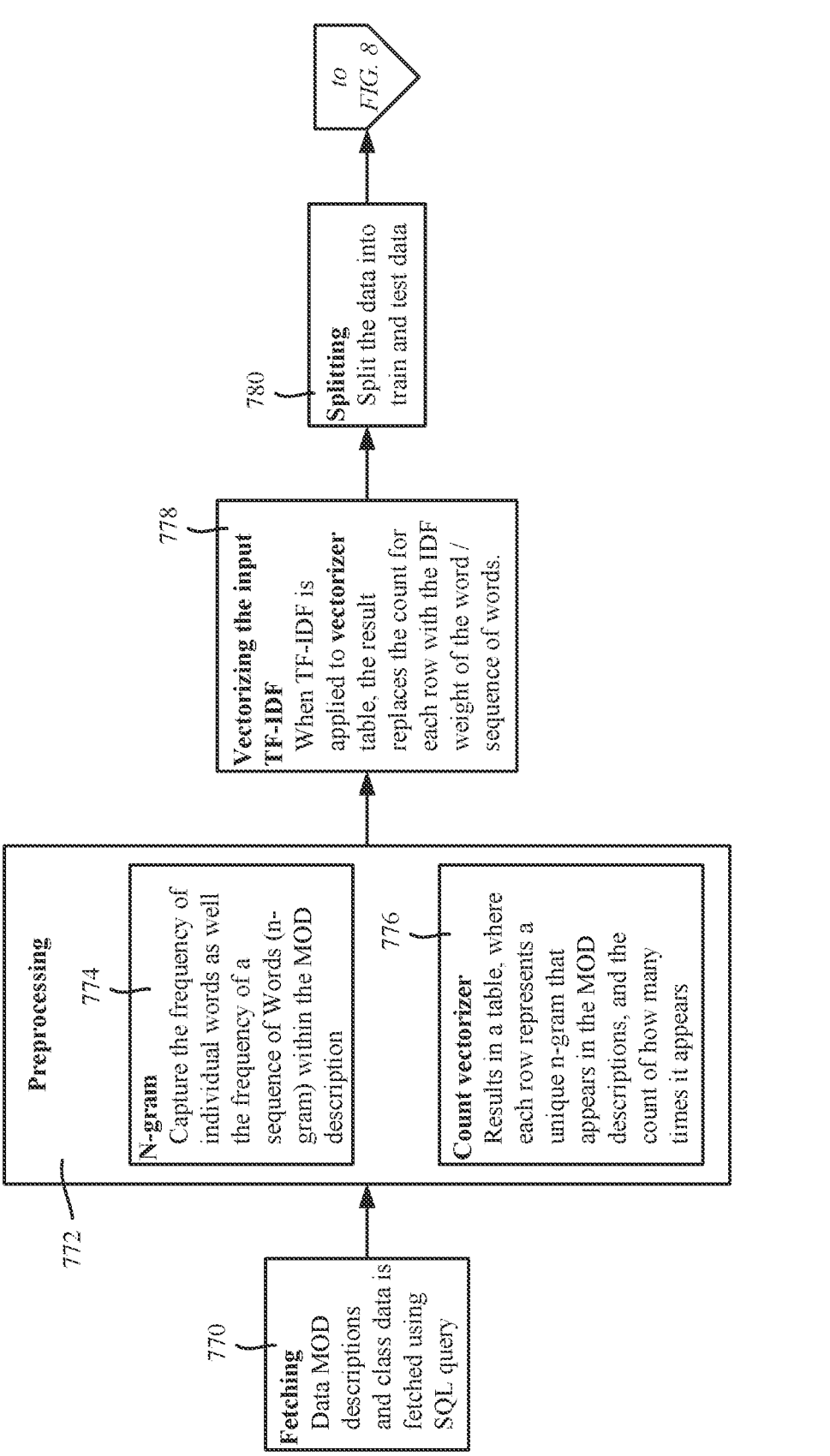

With respect to training of the classification model, FIGS. 7 and 8 show some of the example operations that can be performed to develop and retrain the model as needed. Block 770 represents fetching data, e.g., a large amount of existing module (MOD) descriptions (e.g., there can be on the order of millions of SKUs used to train the models) and their corresponding class data, such as via a SQL query to a data store; this facilitates capturing relevant SKU attributes and patterns. Preprocessing (block 772) includes natural language processing, shown via the techniques of n-gram in block 774, which captures the frequency of individual words as well the frequency of a sequence of words (n-gram) within the MOD description. Further, a count vectorizer 776 captures the frequency of words and a sequence of words, resulting in a data structure (table) in which each row represents a unique n-gram that appears in the MOD descriptions, and the count of how many times it appears.

A TF-IDF vectorizer (block 778) is used for vectorizing the input to assign weights to the most frequent words. When TF-IDF is applied to vectorizer table, the result replaces the count for each row with the IDF weight of the word/sequence of words. The vectorized data (the TF-IDF matrix) is then split (block 780) into training data and test data, so that a suitable percentage of each is available.

The training process continues at block 882 of FIG. 8, where the training portion of the TF-IDF matrix is used as an input to an SVM classifier. Training trains N-binary classifiers, one for each class. The SVM classifier learns to categorize respective documents (MOD descriptions) into one specific category of code class based on their respective TF-IDF features.

Block 884 represents calibrating the output, that is, calibrating a ClassifierCV to ensure that the predicted probabilities of the SVM are well calibrated and can be interpreted as estimates of the true probabilities of class. Testing (block 886) evaluates the performance of the model on the testing portion of the data to assess its accuracy, precision, recall, and F1-score (the harmonic mean of precision and recall). The result is a calibrated classifier SVM used to classify and predict a class with an improved calibration of the predicted probability.

Turning to some examples, consider that a user wants to predict the class attribute of a hardware SKU using the model described herein. The classification data, along with the predicted probability of class membership is desired, and can be predicted by automating the process of identifying patterns of a SKUs' bundled MOD descriptions as input to the model and the SKU's classification data as output from the model.

Figure 9:
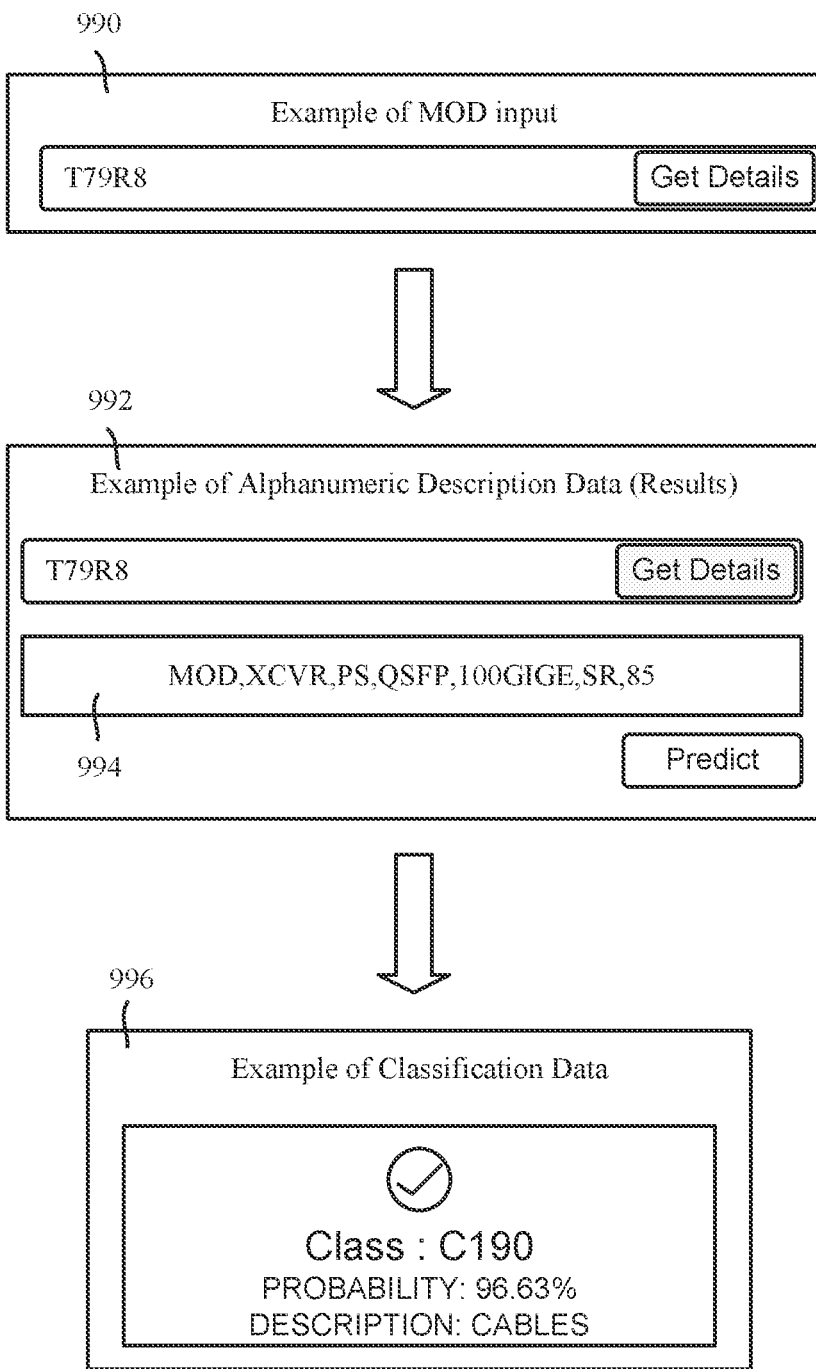
FIG. 9 is an example of a user interacting with the classification system via a user interface to obtain classification data corresponding to one class, in accordance with various aspects and implementations of the subject disclosure.

In FIG. 9, the user wants to create a SKU and the SKU description is ambiguous with respect to determining the class; for example, the SKU description may be "Power-Store QSFP 100GIGE SR 85C OPTICAL" or some other group of terms that is vague or can be interpreted in multiple different ways. However, the user does know the MOD number [T79R8] associated with the SKU.

Thus, as represented in block 990 of FIG. 9, the user enters T79R8 into a user interface element and clicks "Get Details" for this entry. As shown in block 992, the results pulled from the data store are returned in the UI in the form of alphanumeric description data (block 994). That is, the user is shown the Mod description that is pulled from the database, and the user can then click "Predict" to obtain the classification data via the selected model as described herein.

Block 996 shows the classification data predicted for this example, including a class code (C190), a probability of the class code recommendation being correct (96.3%), and a human-readable description (cables) of the class. In this way, simply by providing a single MOD description, a user obtains the class code to a high likelihood of being correct.

Figure 10:
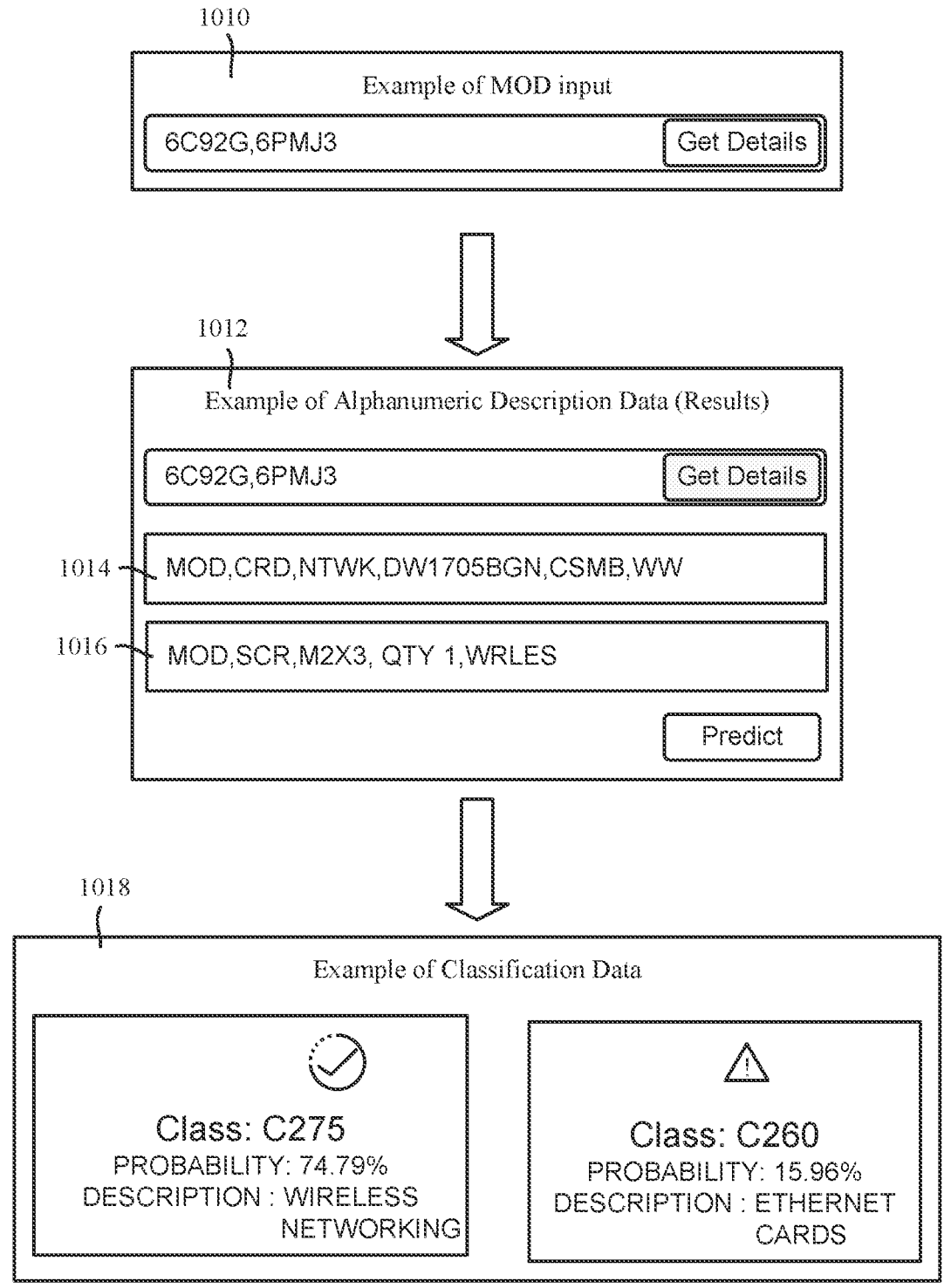
FIG. 10 is an example of a user interacting with the classification system via a user interface to obtain classification data corresponding to two candidate classes, in accordance with various aspects and implementations of the subject disclosure.

FIG. 10 shows another example, in which a user wants to create a SKU with multiple MODs bundled under it. The example SKU description can be something such as DW 1705 802.11bgn+Bluetooth 4.0, 2.4 GHz, 1×1; this is an ambiguous description with respect to classifying a SKU.

Instead of performing research for manual guessing from a large list of candidate classes, and so on, a user can pass a comma separated list of MODs under the SKU (block 1010), e.g., [6C92G,6PMJ3] in this example. As shown via blocks 1014 and 1016, the system described herein auto-populates the MOD descriptions, e.g., MOD,CRD,NTWK, DW1705BGN,CSMB, WW and MOD,SCR,M2X3, QTY 1,WRLES.

When the user clicks on Predict, the selected classifier model (the two MOD model because of the two MODs entered) provides the classification data (block 1018). In this example, the model is able to recommend that the product is class C275 (Wireless networking) with 74.7% probability, or a C260 (Ethernet card) with 15.9% probability.

Figure 11:
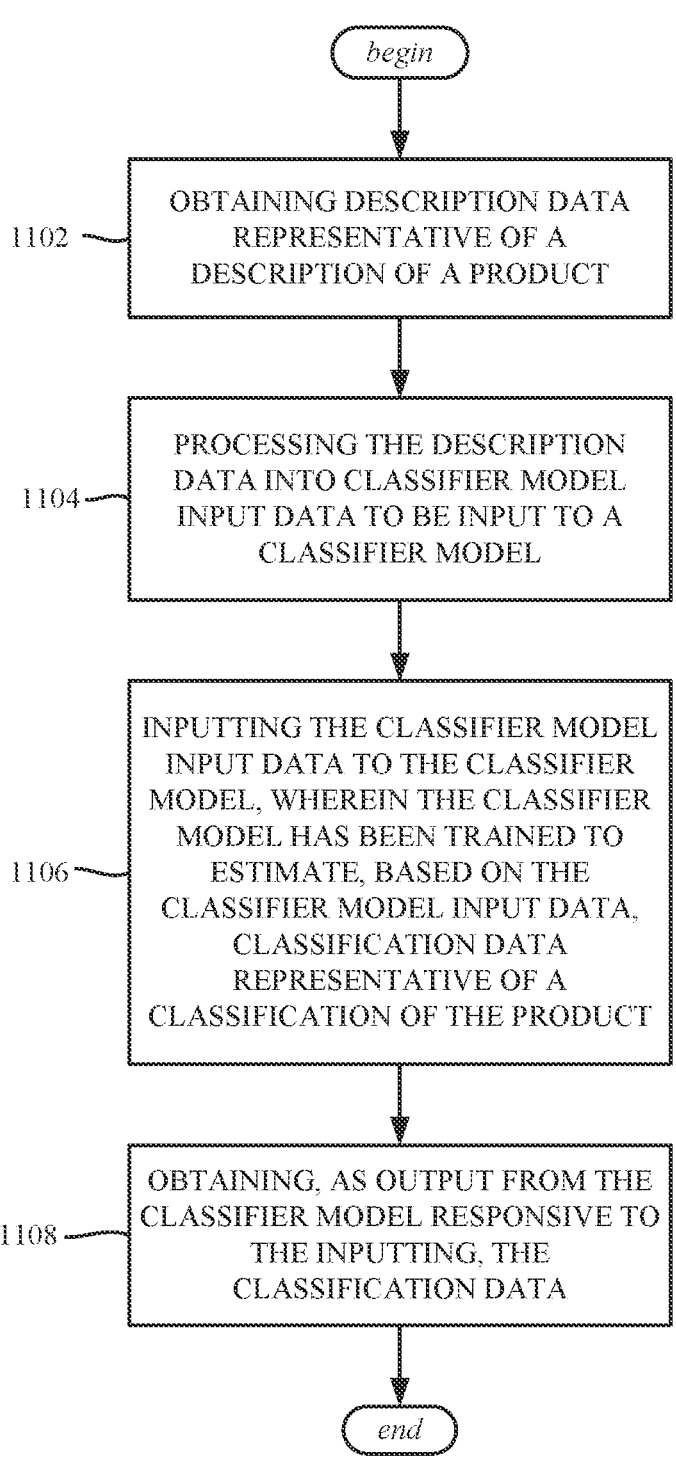
FIG. 11 is a flow diagram showing example operations related to outputting classification data based on product description data, in accordance with various aspects and implementations of the subject disclosure.

One or more aspects can be embodied in a system, such as represented in the example operations of FIG. 11, and for example can include a memory that stores computer executable components and/or operations, and a processor that executes computer executable components and/or operations stored in the memory. Example operations can include operation 1102, which represents obtaining description data representative of a description of a product. Example operation 1104 represents processing the description data into classifier model input data to be input to a classifier model. Example operation 1106 represents inputting the classifier model input data to the classifier model, wherein the classifier model has been trained to estimate, based on the classifier model input data, classification data representative of a classification of the product. Example operation 1108 represents obtaining, as output from the classifier model responsive to the inputting, the classification data.

Obtaining the description data can include obtaining module identification data associated with an enterprise-specific identifier of the product, and retrieving, based on the module identification data, alphanumeric data.

Processing the textual data into the classifier model input data can include performing natural language processing on the alphanumeric data to obtain feature data, and vectorizing the feature data into the classifier model input data.

The module identification data can be part of store keeping unit data representative of a store keeping unit. The module identification data can include at least two module identifiers associated with the store keeping unit, and further operations can include selecting the classifier model based on a count of the module identifiers.

Further operations can include communicating information comprising the classification data with an enterprise resource planning system. Communicating the information can include at least one of: communicating via a defined application programming interface, performing data mapping and transformation on the classification data, or communicating event data to the enterprise resource planning system.

The classifier model can include a support vector machine. The support vector machine can include a calibrated classifier support vector machine.

Obtaining the classification data can include obtaining a class code identifier and a probability value associated with the class code identifier, and wherein the probability value is representative of a likelihood of the class code identifier being correct.

Obtaining the classification data can include obtaining a class code, a human-readable description associated with the class code, and a probability value associated with the class code.

Obtaining the classification data can include obtaining a first class code, a first probability value associated with the first class code, a second class code and a second probability value associated with the second class code.

One or more example aspects, such as corresponding to example operations of a method, are represented in FIG. 12. Example operation 1202 represents obtaining, by a system comprising a processor, input data representative of a number of one or more modules associated with a stock keeping unit. Example operation 1204 represents obtaining, by the system, respective module description data for the one or more modules. Example operation 1206 represents selecting, by the system based on the number of the one or more modules, a classifier model. Example operation 1208 represents inputting, by the system, the respective module description data to the classifier model. Example operation 1210 represents in response to the inputting, obtaining, by the system from the classifier model, predicted classification data representative of class data. Example operation 1212 represents outputting, by the system, the class data.

Further operations can include outputting, by the system, a human-readable description of the class data in conjunction with the outputting of the class data.

Further operations can include outputting, by the system, probability data in conjunction with the outputting of the class data, the probability data representing a likelihood of the predicted classification data representative of the class data being correct.

The predicted classification data can represent a group of two or more respective candidate classes, and further operations can include outputting, by the system, respective values representing respective probability values of the respective classes of the predicted classification data of the stock keeping unit being correct.

FIG. 13 summarizes various example operations, e.g., corresponding to a machine-readable medium, comprising executable instructions that, when executed by a processor, facilitate performance of operations. Example operation 1302 represents obtaining module data representative of at least one module associated with a stock keeping unit. Example operation 1304 represents obtaining alphanumeric description data corresponding to the module data. Example operation 1306 represents processing the alphanumeric description data into classification input data. Example operation 1308 represents inputting the classification input data into a trained classifier. Example operation 1310 represents obtaining, based on the inputting of the classification input data, classification data from the trained classifier.

Further operations can include communicating information based on the classification data to an enterprise resource planning system.

Further operations can include selecting the classifier from a group of available classifiers based on a count of the at least one module.

Obtaining the classification data can include obtaining output data comprising at least one of: a class code identifier, a probability value associated with the classification data, or a human-readable description associated with the classification data, and further operations can include outputting the output data.

As can be seen, the technology described herein facilitates product-related classification in a way that removes manual errors and ambiguity in attribute authoring. The technology does not need a user-provided SKU description as an input, which can be vague or non-descriptive at times. Instead, the technology described herein leverages machine learning/ artificial intelligence and mathematical models to recognize patterns in SKU data and generate predictions based on those patterns. This comprehensive approach to SKU classification, based on understanding intricate business complexities associated with the classification of product data, and more particularly product classification, encompasses data preprocessing, feature engineering, machine learning-based classification, integration of context-specific rules, and seamless integration with ERP systems. By helping to automate the classification process, the system can improve data management, optimize supply chain operations, enhance pricing strategies, ensure regulatory compliance, and enable data-driven decision making.

The technology described herein that provides data integrity and quality, thus can significantly help to avoid supply chain disruptions, pricing inconsistencies, regulatory compliance issues, operational inefficiencies, cost overruns and negative customer experiences. The implementing of an accurate and context-aware SKU classification system as described herein can mitigate these impacts and better optimize operations.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
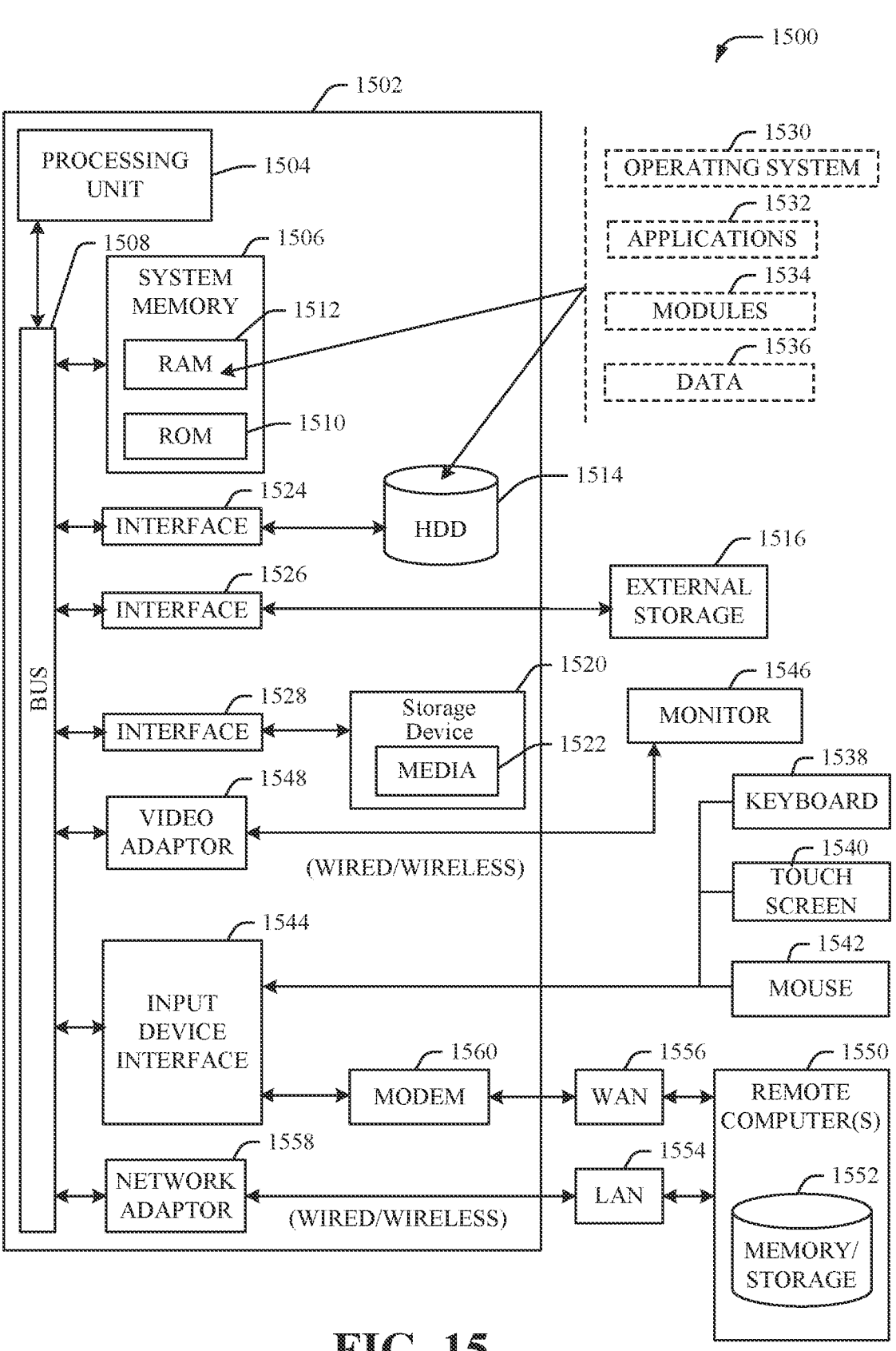
FIG. 15 depicts an example schematic block diagram of a computing environment with which the disclosed subject matter can interact/be implemented at least in part, in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1594 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining, by the at least one processor, description data representative of a description of a product, wherein obtaining the description data comprises:

determining, by the at least one processor, a stock keeping unit of the product based on the description data, determining, by the at least one processor, a quantity of modules under the stock keeping unit, wherein each module of the quantity of modules corresponds to a respective part of the product under the stock keeping unit;

selecting, by the at least one processor, a classifier model from a group of classifier models based on the quantity of modules under the stock keeping unit;

processing, by the at least one processor, the description data into classifier model input data to be input to the classifier model;

inputting, by the at least one processor, the classifier model input data to the classifier model, wherein the classifier model has been trained to estimate, based on the classifier model input data, classification data representative of a classification of the product; and obtaining, by the at least one processor, as output from the classifier model responsive to the inputting, the classification data.

2. The system of claim 1, wherein the obtaining of the description data comprises obtaining module identification data associated with an enterprise-specific identifier of the product, and retrieving, based on the module identification data, alphanumeric data.

3. The system of claim 2, wherein the processing of the description data into the classifier model input data comprises performing natural language processing on the alphanumeric data to obtain feature data, and vectorizing the feature data into the classifier model input data.

4. The system of claim 2, wherein the module identification data is part of store keeping unit data representative of the stock keeping unit.

5. The system of claim 1, wherein the operations further comprise communicating information comprising the classification data with an enterprise resource planning system.

6. The system of claim 5, wherein the communicating of the information comprises at least one of: communicating via a defined application programming interface, performing data mapping and transformation on the classification data, or communicating event data to the enterprise resource planning system.

7. The system of claim 1, wherein the classifier model comprises a support vector machine.

8. The system of claim 7, wherein the support vector machine comprises a calibrated classifier support vector machine.

9. The system of claim 1, wherein the obtaining of the classification data comprises obtaining a class code identifier and a probability value associated with the class code identifier, and wherein the probability value is representative of a likelihood of the class code identifier being correct.

10. The system of claim 1, wherein the obtaining of the classification data comprises obtaining a class code, a human-readable description associated with the class code, and a probability value associated with the class code.

11. The system of claim 1, wherein the obtaining of the classification data comprises obtaining a first class code, a first probability value associated with the first class code, a second class code and a second probability value associated with the second class code.

12. A method, comprising:

obtaining, by a system comprising at least one processor, input data representative of a quantity of modules under a stock keeping unit of a product, wherein each module of the quantity of modules corresponds to a respective part of the product under the stock keeping unit;

obtaining, by the system, respective module description data for the modules;

selecting, by the system based on the quantity of modules, a classifier model from a group of classifier models;

inputting, by the system, the respective module description data to the classifier model;

in response to the inputting, obtaining, by the system from the classifier model, predicted classification data representative of class data; and outputting, by the system, the class data.

13. The method of claim 12, further comprising outputting, by the system, a human-readable description of the class data in conjunction with the outputting of the class data.

14. The method of claim 12, further comprising outputting, by the system, probability data in conjunction with the outputting of the class data, the probability data representing a likelihood of the predicted classification data representative of the class data being correct.

15. The method of claim 12, wherein the predicted classification data represents a group of two or more respective candidate classes, and further comprising outputting, by the system, respective values representing respective probability values of the respective classes of the predicted classification data of the stock keeping unit being correct.

16. A non-transitory machine-readable medium, comprising executable instructions that, when executed by at least one processor, facilitate performance of operations, the operations comprising:

obtaining module data representative of at least one module associated with a stock keeping unit of a product;

obtaining alphanumeric description data corresponding to the module data;

processing the alphanumeric description data into classification input data;

determining, based on the module data, a quantity of modules under the stock keeping unit, wherein each module of the quantity of modules corresponds to a respective part of the product under the stock keeping unit;

selecting a classifier model from a group of classifier models based on the quantity of modules under the stock keeping unit;

inputting the classification input data into the classifier model; and obtaining, based on the inputting of the classification input data, classification data from the classifier model.

17. The non-transitory machine-readable medium of claim 16, wherein the operations further comprise communicating information based on the classification data to an enterprise resource planning system.

18. The non-transitory machine-readable medium of claim 16, wherein the obtaining of the classification data comprises obtaining output data comprising at least one of: a class code identifier, a probability value associated with the classification data, or a human-readable description associated with the classification data, and wherein the operations further comprise outputting the output data.

19. The non-transitory machine-readable medium of claim 16, wherein processing the alphanumeric description data into the classification input data comprises performing natural language processing on the alphanumeric description data to obtain feature data, and vectorizing the feature data into the classification input data.

20. The non-transitory machine-readable medium of claim 16, wherein the classifier model comprises a calibrated classifier support vector machine.

* * * * *